United States Patent
Yum et al.

(10) Patent No.: US 11,005,547 B2
(45) Date of Patent: May 11, 2021

(54) METHOD FOR CHANNEL STATE REPORTING IN WIRELESS COMMUNICATION SYSTEM AND APPARATUS FOR SAME

(71) Applicant: LG Electronics Inc., Seoul (KR)

(72) Inventors: Kunil Yum, Seoul (KR); Jonghyun Park, Seoul (KR); Hyungtae Kim, Seoul (KR); Jiwon Kang, Seoul (KR); Kilbom Lee, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/476,010

(22) PCT Filed: Jan. 2, 2018

(86) PCT No.: PCT/KR2018/000012
§ 371 (c)(1),
(2) Date: Jul. 3, 2019

(87) PCT Pub. No.: WO2018/128340
PCT Pub. Date: Jul. 12, 2018

(65) Prior Publication Data
US 2019/0349052 A1    Nov. 14, 2019

Related U.S. Application Data

(60) Provisional application No. 62/542,735, filed on Aug. 8, 2017, provisional application No. 62/442,378, filed on Jan. 4, 2017.

(51) Int. Cl.
*H04B 7/06* (2006.01)
*H04L 1/00* (2006.01)
(Continued)

(52) U.S. Cl.
CPC ......... *H04B 7/0626* (2013.01); *H04L 1/0026* (2013.01); *H04L 5/0048* (2013.01); *H04W 24/10* (2013.01); *H04W 72/10* (2013.01)

(58) Field of Classification Search
CPC ... H04B 7/0626; H04L 1/0026; H04L 5/0048; H04L 5/0035; H04W 24/10; H04W 72/10
See application file for complete search history.

(56) References Cited

U.S. PATENT DOCUMENTS 9,253,791 B2 *   2/2016   Ihm ...................... H04W 72/10
2015/0029966 A1 * 1/2015 Park ...................... H04L 5/0053
                                                                370/329
(Continued)

FOREIGN PATENT DOCUMENTS

KR        1020160093533        8/2016

OTHER PUBLICATIONS

Samsung, "handling collision between nonPrecoded type and beamformed type CSI reports", R1-160534, 3GPP RAN WG1 Meeting #84, St Julian;s Malta, Feb. 15-19, 2016, 3 Pages (Year: 2016).*

(Continued)

*Primary Examiner* — Pao Sinkantarakorn
*Assistant Examiner* — Kabir U Jahangir
(74) *Attorney, Agent, or Firm* — Fish & Richardson P.C.

(57) ABSTRACT

A method for channel state information-reference signal (CSI-RS)-based channel state reporting in a wireless communication system according to one embodiment of the present disclosure may comprise the steps of: receiving a CSI-RS-related configuration from a base station; calculating CSI by measuring a CSI-RS according to the CSI-RS-related configuration; and transmitting the calculated CSI to the base station, wherein the CSI-RS-related configuration comprises configurations for different types of CSI-RSs, and (Continued)

when at least two different types of CSI-RSs are configured to be transmitted in the same resource, a terminal measures only a CSI-RS having a predetermined higher priority.

14 Claims, 8 Drawing Sheets

(51) Int. Cl.
*H04L 5/00* (2006.01)
*H04W 24/10* (2009.01)
*H04W 72/10* (2009.01)

(56) References Cited

U.S. PATENT DOCUMENTS

| | | | |
|---|---|---|---|
| 2015/0063177 A1* | 3/2015 | Kim | H04L 5/0048 370/280 |
| 2015/0146558 A1* | 5/2015 | Yi | H04W 24/10 370/252 |
| 2015/0349867 A1* | 12/2015 | Guo | H04B 7/0632 370/252 |
| 2017/0195031 A1* | 7/2017 | Onggosanusi | H04L 5/0048 |
| 2019/0230549 A1* | 7/2019 | Wang | H04B 7/024 |
| 2020/0014446 A1* | 1/2020 | Tomeba | H04W 72/04 |

OTHER PUBLICATIONS

PCT International Search Report and Written Opinion in International Application No. PCT/KR2018/000012, dated Apr. 10, 2018, 23 pages (with English translation).

Huawei, HiSilicon, "On the need for more flexible configurations related to CSI reporting," R1-1611237, 3GPP TSG RAN WG1 Meeting #87, Reno, USA, Nov. 14-18, 2016, 6 pages.

Qualcomm Incorporated, "Remaining details on hybrid CSI," R1-1611603, 3GPP TSG-RAN WG1 #87, Reno, USA, Nov. 14-18, 2016, 3 pages.

Huawei, HiSilicon, "Independent and joint control of CSI-RS transmission and CSI reporting for NR MIMO," R1-1611236, 3GPP TSG RAN WG1 Meeting #87, Reno, USA, Nov. 14-18, 2016, 5 pages.

Ericsson, "On CSI measurements and reporting," R1-1612349, 3GPP TSG-RAN WG1 #87, Reno, Nevada, Nov. 14-18, 2016, 4 pages.

* cited by examiner

METHOD FOR CHANNEL STATE REPORTING IN WIRELESS COMMUNICATION SYSTEM AND APPARATUS FOR SAME

CROSS-REFERENCE TO RELATED APPLICATIONS

This application is a National Stage application under 35 U.S.C. § 371 of International Application No. PCT/KR2018/000012, filed on Jan. 2, 2018, which claims the benefit of U.S. Provisional Application No. 62/542,735, filed on Aug. 8, 2017, and U.S. Provisional Application No. 62/442,378, filed on Jan. 4, 2017. The disclosures of the prior applications are incorporated by reference in their entirety.

TECHNICAL FIELD

The present disclosure relates to a wireless communication system, and more particularly to, a method for reporting a channel state and apparatus therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

The object of the present disclosure is to provide a method of reporting a channel state. More specifically, the object of the present disclosure is to provide a method of reporting a channel state based on a channel state information-reference signal (CSI-RS).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of reporting a channel state based on a channel state information-reference signal (CSI-RS) in a wireless communication system. The method may include: receiving a CSI-RS related configuration from a base station; calculating CSI by measuring a CSI-RS according to the CSI-RS related configuration; and transmitting the calculated CSI to the base station. The CSI-RS related configuration may include configurations on different types of CSI-RSs. If at least two different types of CSI-RSs are configured to be transmitted on a same resource, a user equipment (UE) may measure only a CSI-RS with a higher predetermined priority.

Additionally or alternatively, the different types of CSI-RSs may include a periodic CSI-RS for CSI, an aperiodic CSI-RS for CSI, a semi-persistent CSI-RS for CSI, a periodic CSI-RS for beam management (BM), an aperiodic CSI-RS for BM, or a semi-persistent CSI-RS for BM.

Additionally or alternatively, the predetermined priority may be determined according to a degree of urgency of CSI, a transmission periodicity of the CSI-RS, or time variation of the CSI-RS.

Additionally or alternatively, the CSI-RS related configuration may include information on a resource to which no CSI-RS is allocated.

Additionally or alternatively, the information on the resource to which no CSI-RS is allocated may be to protect a CSI-RS for another UE.

Additionally or alternatively, the method may include, when the resource to which no CSI-RS is allocated partially overlaps with a resource to which a CSI-RS is allocated, measuring only a CSI-RS received on a non-overlapping resource.

Additionally or alternatively, when a resource to which a CSI-RS for beam management (BM) is allocated partially overlaps with a resource to which a CSI-RS for CSI is allocated, the CSI-RS for BM may be transmitted for a beam currently used by the base station on at least part of the resource to which the CSI-RS for BM is allocated.

Additionally or alternatively, when an aperiodic CSI-RS and a semi-persistent or periodic CSI-RS are configured to be transmitted on a same resource, the UE may measure only the aperiodic CSI-RS.

Additionally or alternatively, when a plurality of CSI-RSs are configured to be transmitted on a same resource, the UE may measure only a CSI-RS with a longest transmission periodicity.

In another aspect of the present disclosure, provided is a user equipment (UE) for reporting a channel state based on a channel state information-reference signal (CSI-RS) in a wireless communication system. The UE may include: a transmitter; a receiver; and a processor configured to control the transmitter and the receiver. The processor may be configured to: receive a CSI-RS related configuration from a base station; calculate CSI by measuring a CSI-RS according to the CSI-RS related configuration; and transmit the calculated CSI to the base station. The CSI-RS related configuration may include configurations on different types of CSI-RSs. If at least two different types of CSI-RSs are configured to be transmitted on a same resource, the UE may measure only a CSI-RS with a higher predetermined priority.

Additionally or alternatively, the different types of CSI-RSs may include a periodic CSI-RS for CSI, an aperiodic CSI-RS for CSI, a semi-persistent CSI-RS for CSI, a periodic CSI-RS for beam management (BM), an aperiodic CSI-RS for BM, or a semi-persistent CSI-RS for BM.

Additionally or alternatively, the predetermined priority may be determined according to a degree of urgency of CSI, a transmission periodicity of the CSI-RS, or time variation of the CSI-RS.

Additionally or alternatively, the CSI-RS related configuration may include information on a resource to which no CSI-RS is allocated.

Additionally or alternatively, the information on the resource to which no CSI-RS is allocated may be to protect a CSI-RS for another UE.

Additionally or alternatively, when the resource to which no CSI-RS is allocated partially overlaps with a resource to which a CSI-RS is allocated, the processor may be configured to measure only a CSI-RS received on a non-overlapping resource.

Additionally or alternatively, when a resource to which a CSI-RS for beam management (BM) is allocated partially overlaps with a resource to which a CSI-RS for CSI is allocated, the CSI-RS for BM may be transmitted for a beam currently used by the base station on at least part of the resource to which the CSI-RS for BM is allocated.

Additionally or alternatively, when an aperiodic CSI-RS and a semi-persistent or periodic CSI-RS are configured to be transmitted on a same resource, the UE may measure only the aperiodic CSI-RS.

Additionally or alternatively, when a plurality of CSI-RSs are configured to be transmitted on a same resource, the UE may measure only a CSI-RS with a longest transmission periodicity.

The above technical solutions are merely some parts of the embodiments of the present disclosure, and various embodiments into which the technical features of the present disclosure are incorporated can be derived and understood by persons skilled in the art from the following detailed description of the present disclosure.

Advantageous Effects

According to embodiments of the present disclosure, a channel state can be efficiently measured.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR CARRYING OUT THE INVENTION

Figure 1:
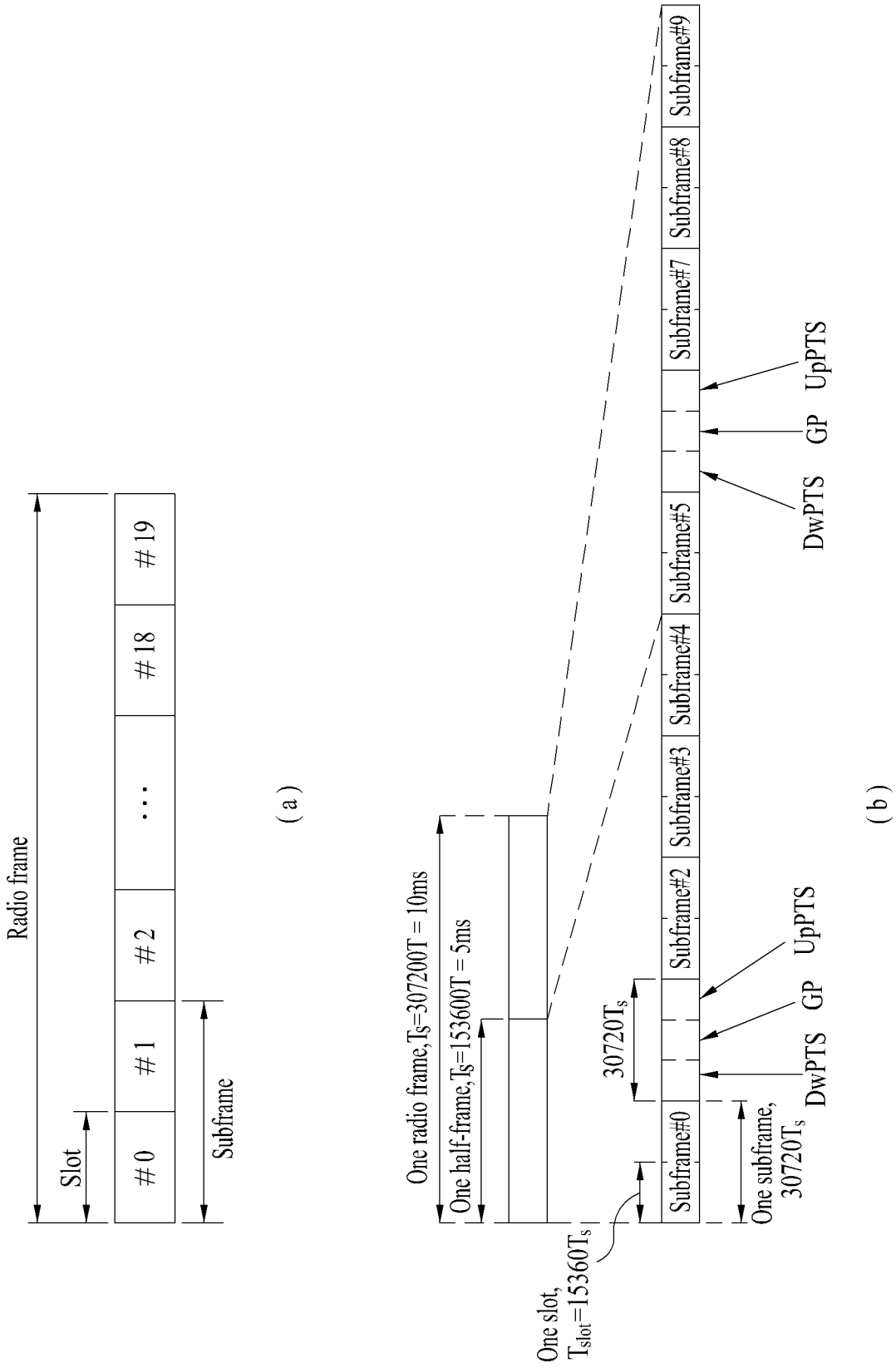
FIG. 1 is a diagram for an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and sub-carriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
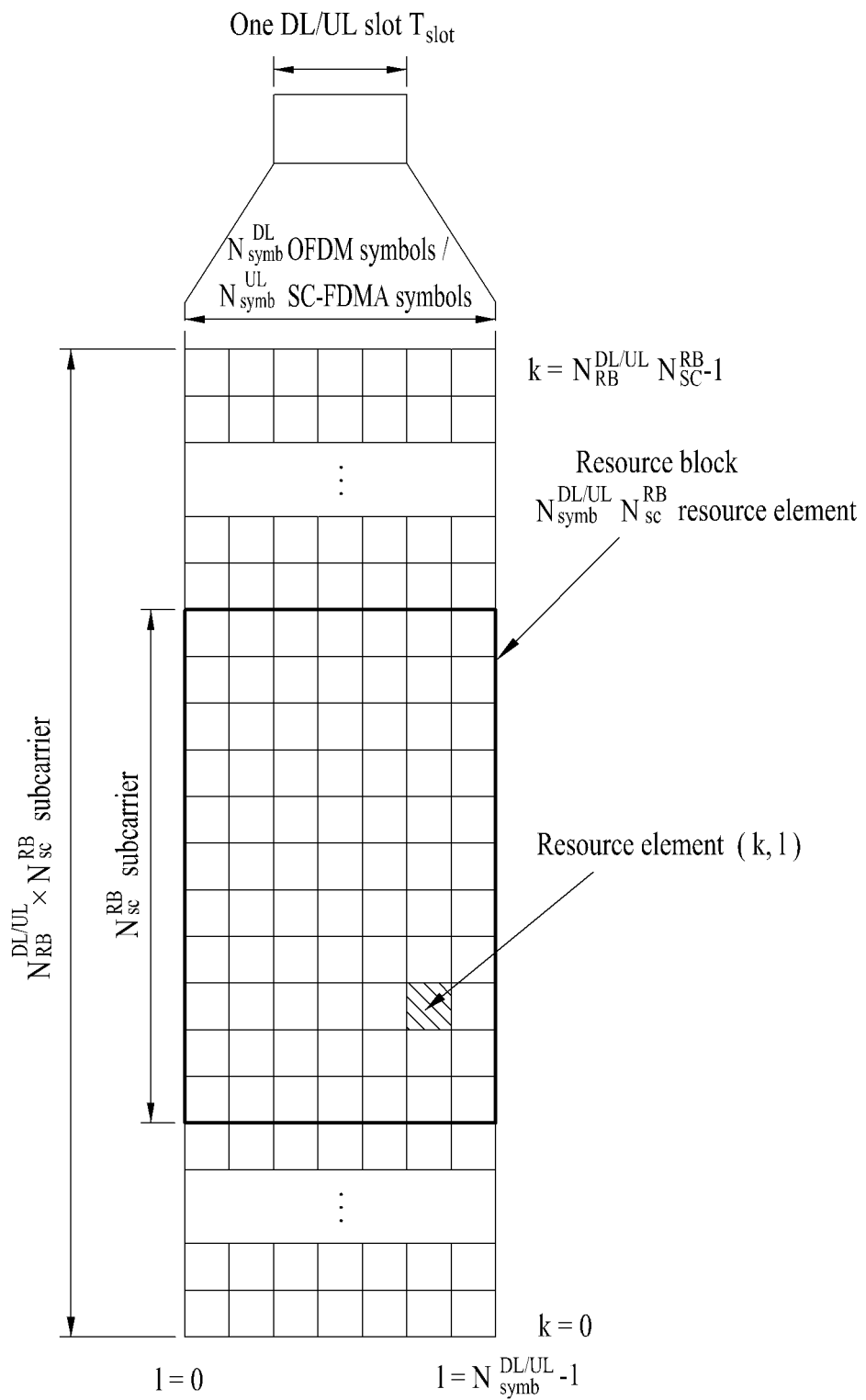
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
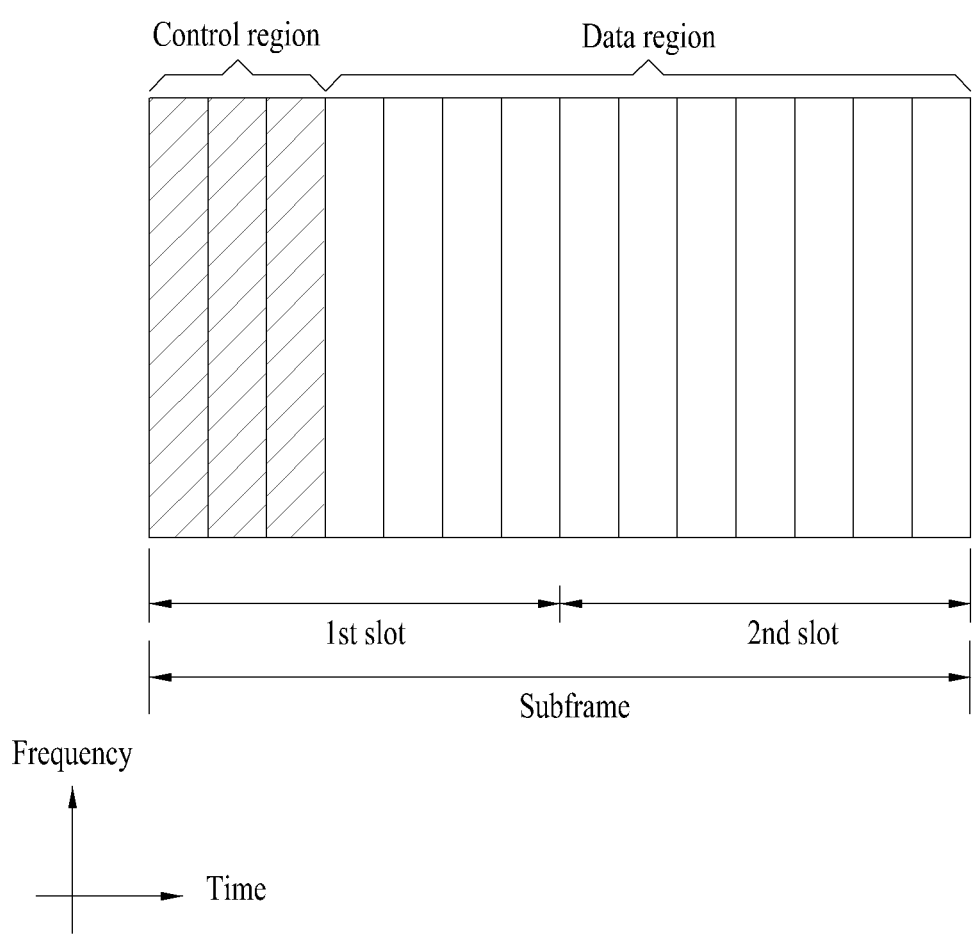
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
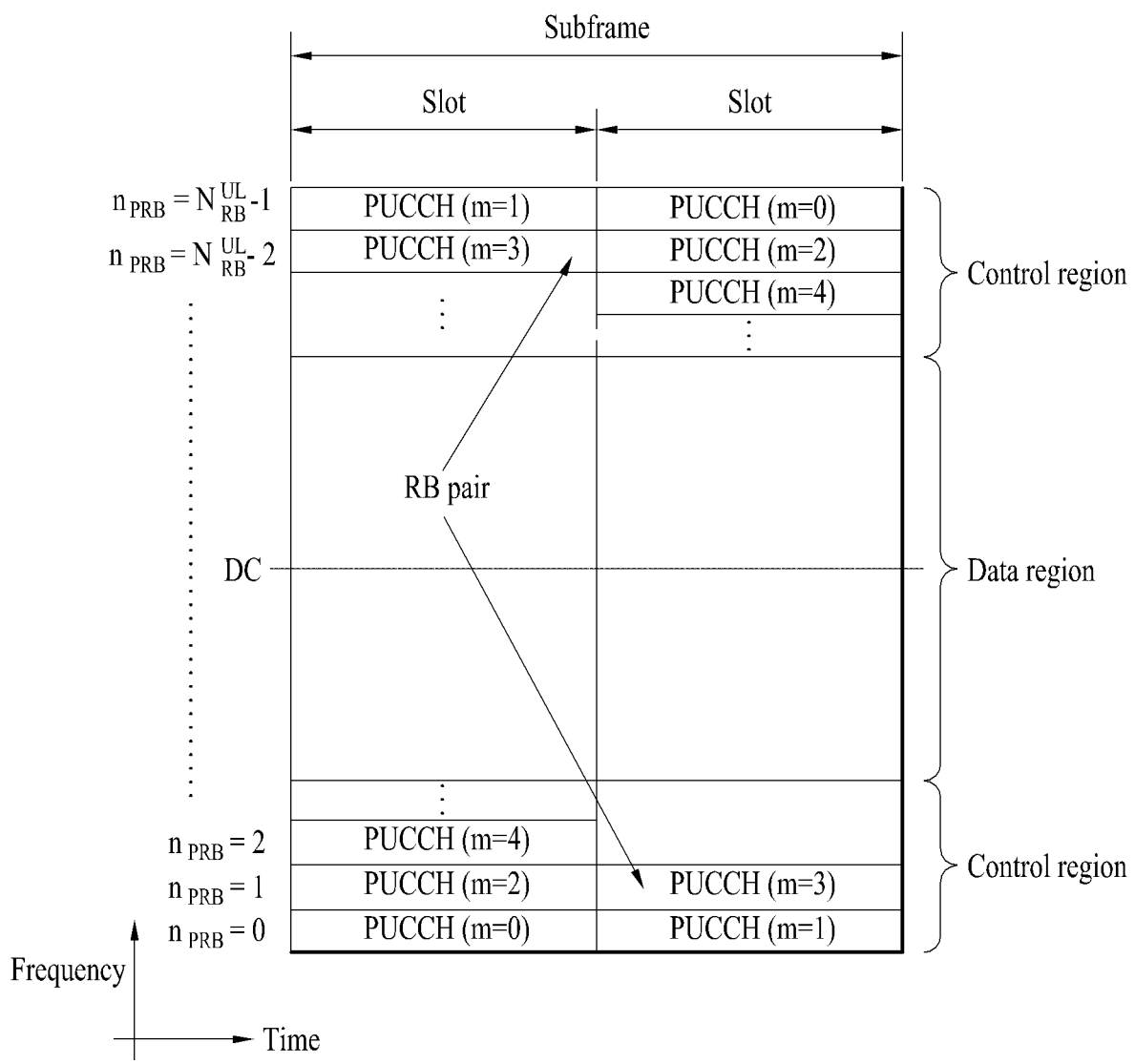
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MB SFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE (-A) system, a UE is defined to report CSI to a BS. Herein, the CSI means information indicating the quality of a radio channel (also called a link) created between a UE and an antenna port. The CSI includes, for example, a rank indicator (RI), a precoding matrix indicator (PMI), and a channel quality indicator (CQI). The RI, which indicates rank information of a channel, means the number of streams that a UE receives on the same time-frequency resource. The RI is determined depending on long-term fading of a channel, and thus it is usually fed back to a BS by a UE with a longer periodicity than that of the PMI or CQI. The PMI is a value reflecting the channel space property and indicates a precoding index preferred by a UE based on a metric such as a signal-to-interference-plus-noise ratio (SINR). The CQI is a value indicating the intensity of a channel and typically indicates a received SINR obtained when the PMI is used by a BS.

Based on measurement of the radio channel, a UE calculates its preferred PMI and RI, which is capable of attaining the optimal or highest transmission rate when used by a BS, in the current channel state and feeds back the calculated PMI and RI to the BS. Herein, the CQI refers to a modulation and coding scheme of providing an acceptable packet error probability for the fed-back PMI/RI.

Meanwhile, the CSI feedback defined in the LTE may not sufficiently support new operations introduced in the LTE-A system such as accurate MU-MIMO operation and explicit CoMP operation. As the requirements for CSI feedback accuracy have become complicated to obtain sufficient MU-MIMO or CoMP throughput gain, it has been agreed that a PMI should be configured with a long term/wideband PMI ($W_1$) and a short term/subband PMI ($W_2$). In other words, a final PMI is expressed as a function of $W_1$ and $W_2$. For example, the final PMI W may be defined as follows: $W=W_1*W_2$ or $W=W_2*W_1$. Accordingly, in the LTE-A, CSI may include a RI, a CQI, $W_1$, and $W_2$.

Table 5 below shows uplink channels used for CSI transmission in the 3GPP LTE (-A) system.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted on a PUCCH with a periodicity defined in higher layers. Depending on whether required by a scheduler, the CSI may be aperiodically transmitted on a PUSCH. The CSI may be transmitted over the PUSCH only in the case of frequency selective scheduling and aperiodic CSI transmission. Hereinafter, a CSI transmission scheme will be described based on scheduling and periodicities.

1) Transmission of CQI/PMI/RI on PUSCH after receipt of CSI transmission request control signal (CSI request)

A PUSCH scheduling control signal (UL grant) transmitted as a PDCCH signal may include a control signal for requesting CSI transmission. Table 6 below shows UE modes for transmitting a CQI, a PMI and a RI on a PUSCH.

TABLE 6

| | PMI Feedback Type | | |
|---|---|---|---|
| | No PMI | Single PMI | Multiple PMIs |
| PUSCH CQI Feed back Type | Wideband (Wideband CQI) | | Mode 1-2 RI 1st wideband CQI (4 bit) 2nd wideband CQI (4 bit) if RI > 1 N * Subband PMI (4 bit) (N is the total # of subbands) (if 8Tx Ant, N * subband W2 + wideband W1) |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband<br>CQI (4 bit) + Best-M CQI (2 bit)<br>(Best-M CQI: Average CQI for M SBs selected from among total N SBs)<br>Best-M index (L bit) | | Mode 2-2<br>RI<br>1st wideband<br>CQI (4 bit) + Best-M CQI (2 bit)<br>2nd wideband<br>CQI (4 bit) + Best-M CQI (2 bit) if RI > 1<br>* Best-M index (L bit)<br>Wideband<br>PMI (4 bit) + Best-M PMI (4 bit)<br>(if 8Tx Ant,<br>wideband W2 +<br>Best-M W2 +<br>wideband W1) |
| Higher Layer-configured (Subband CQI) | Mode 3-0<br>RI (only for Open-loop SM)<br>1st wideband<br>CQI (4 bit) + N * subband CQI (2 bit) | Mode 3-1<br>RI<br>1st wideband<br>CQI (4 bit) +<br>N * subbandCQI (2 bit)<br>2nd wideband<br>CQI(4 bit) +<br>N * subbandCQI (2 bit)<br>if RI > 1<br>Wideband<br>PMI (4 bit)<br>(if 8Tx Ant,<br>wideband W2 +<br>wideband W1) | Mode 3-2<br>RI<br>1st wideband<br>CQI (4 bit) +<br>N * subbandCQI (2 bit)<br>2nd wideband<br>CQI (4 bit) +<br>N * subbandCQI (2 bit)<br>if RI > 1<br>N * Subband<br>PMI (4 bit)<br>(N is the total # of subbands)<br>(if 8Tx Ant,<br>N * subband W2 +<br>wideband W1) |

The transmission modes of Table 3 are selected by higher layers, and the CQI/PMI/RI are all transmitted in a PUSCH subframe. Hereinafter, how a UE performs uplink transmission in each mode will be described.

Mode 1-2 represents a case where a precoding matrix is selected for each subband on the assumption that data is transmitted only in subbands. A UE generates a CQI by assuming that a precoding matrix is selected for the system band or the entirety of a band (set S) designated by higher layers. In Mode 1-2, the UE may transmit the CQI and the PMI for each subband. In this case, the size of each subband may depend on the size of the system band.

In Mode 2-0, a UE may select M preferred subbands for the system band or a band (set S) designated by higher layers. The UE may generate one CQI value on the assumption that data is transmitted in the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI (WB-CQI) index.

The UE in Mode 2-0 may transmit, to a BS, information on the locations of the M selected subbands, one CQI value for the M selected subbands, and a CQI value generated for the entire band or a designated band (set S). In this case, the size of each subband and the value of M may depend on the size of the system band.

In Mode 2-2, a UE may simultaneously select the locations of M preferred subbands and a single precoding matrix for the M preferred subbands on the assumption that data is transmitted in the M preferred subbands. In this case, a CQI value for the M preferred subbands is defined per codeword. In addition, the UE additionally generates a WB CQI value for the system band or a designated band (set S).

The UE in Mode 2-2 may transmit, to a BS, information on the locations of the M preferred subbands, one CQI value for the M selected subbands, a single PMI for the M preferred subbands, a WB PMI, and a WB CQI value. In this case, the size of a subband and the value of M may depend on the size of the system band.

In Mode 3-0, a UE generates a WB CQI value. The UE generates a CQI value for each subband on the assumption that data is transmitted in each subband. In this case, even if RI>1, the CQI value represents only a CQI value for the first codeword.

In Mode 3-1, a UE generates a single precoding matrix for the system band or a designated band (set S). The UE generates a subband CQI for each codeword by assuming that the single precoding matrix is applied to each subband. In addition, the UE may generate a WB CQI by assuming the single precoding matrix. A CQI value for each subband may be expressed in a differential form. The subband CQI value is determined as a difference between subband CQI and WB CQI indices. In this case, the size of each subband may depend on the size of the system band.

In Mode 3-2, a UE generates a precoding matrix for each subband instead of a single precoding matrix for the entire band, compared to Mode 3-1.

2) Periodic CQI/PMI/RI transmission on PUCCH

A UE may periodically transmit CSI (e.g., CQI/PMI/PTI (precoding type indicator) and/or RI information) to a BS on a PUCCH. If the UE receives a control signal instructing transmission of user data, the UE may transmit a CQI on the PUCCH. Even if the control signal is transmitted on a PUSCH, the CQI/PMI/PTI/RI may be transmitted in one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

A UE may use the transmission modes shown in Table 7. Referring to Table 7, in Mode 2-0 and Mode 2-1, a bandwidth part (BP) may mean a set of consecutive subbands in the frequency domain and cover the system band or a designated band (set S). In Table 7, the size of each subband, the size of a BP, and the number of BPs may depend on the size of the system band. In addition, the UE transmits CQIs for individual BPs in ascending order in the frequency domain in order to cover the system band or the designated band (set S).

A UE may have the following PUCCH transmission types according to transmission combinations of CQI/PMI/PTI/RI.

i) Type 1: A subband (SB) CQI is transmitted in Mode 2-0 and Mode 2-1.
    ii) Type 1a: An SB CQI and a second PMI are transmitted.
    iii) Types 2, 2b and 2c: A WB CQI and a PMI are transmitted.
    iv) Type 2a: A WB PMI is transmitted.
    v) Type 3: An RI is transmitted.
    vi) Type 4: A WB CQI is transmitted.
    vii) Type 5: An RI and a WB PMI are transmitted.
    viii) Type 6: An RI and a PTI are transmitted.
    ix) Type 7: A CSI-RS resource indicator (CRI) and an RI are transmitted.
    x) Type 8: A CRI, an RI, and a WB PMI are transmitted.
    xi) Type 9: A CRI, and RI, and a PTI are transmitted.
    xii) Type 10: A CRI is transmitted.

When the UE transmits an RI and a WB CQI/PMI, the CQI/PMI are transmitted in subframes with different periodicities and offsets. If the RI needs to be transmitted in the same subframe as the WB CQI/PMI, the CQI/PMI are not transmitted.

Aperiodic CSI Request

The current LTE specification uses a 2-bit CSI request field in DCI format 0 or 4 to provide aperiodic CSI feedback, considering a carrier aggregation (CA) environment. That is, if a UE is configured with multiple serving cells in the CA environment, the UE may recognize that the 2-bit CSI request field is used. If one of TMs 1 to 9 is set for all component carriers (CCs), aperiodic CSI feedback is triggered according to the values in Table 8 below. If TM 10 is set for at least one of the CCs, the aperiodic CSI feedback is triggered according to the values in Table 8 below.

TABLE 8

| CSI request field value | Description |
|---|---|
| '00' | No aperiodic CSI reporting is triggered |
| '01' | Aperiodic CSI reporting is triggered for a serving cell |
| '10' | Aperiodic CSI reporting is triggered for a first group of serving cells configured by higher layers |

TABLE 8-continued

| CSI request field value | Description |
|---|---|
| '11' | Aperiodic CSI reporting is triggered for a second group of serving cells configured by higher layers |

TABLE 9

| CSI request field value | Description |
|---|---|
| '00' | No aperiodic CSI reporting is triggered |
| '01' | Aperiodic CSI reporting is triggered for a CSI process group configured by higher layers for a serving cell |
| '10' | Aperiodic CSI reporting is triggered for a first group of CSI processes configured by higher layers |
| '11' | Aperiodic CSI reporting is triggered for a second group of CSI processes configured by higher layers |

In the new RAT, a semi-persistent CSI-RS (SP-CSI-RS or SP-CSI-RS) and an aperiodic CSI-RS (A-CSI-RS or A-CSI-RS) have been introduced in addition to a periodic CSI-RS (P-CSI-RS or P-CSI-RS). The P-CSI-RS means a CSI-RS with a long-term configuration such as an RRC configuration among CSI-RSs transmitted with a predetermined periodicity, similar to the CSI-RS defined in the legacy LTE. Meanwhile, the SP-CSI-RS is transmitted with a predetermined periodicity similar to the P-CSI-RS, but ON/OFF thereof is signaled to a UE through MAC signaling/DCI signaling with lower latency than the RRC configuration. The A-CSI-RS is signaled to a UE through dynamic signaling such as DCI and transmitted at one transmission timing in a one-shot manner. The CSI-RS may be used for different purposes, for example, CSI measurement, beam management (BM), etc. In particular, in the case of the BM, a UE measures a CSI-RS to report a beam selected from a plurality of (analog) beams (for example, to report the index of the beam). In this case, more CSI-RS symbols are used to transmit CSI-RSs applied to different (analog) beams, compared to a CSI-RS for CSI.

Since a UE may be configured with different types of CSI-RSs as described above, different CSI-RSs, for example, a P-CSI-RS for BM and a SP-CSI-RS for CSI reporting may be transmitted at the same time depending on configured periodicities and offsets or the transmission timing of an A-CSI-RS, or the transmission timing of the A-CSI-RS may overlap with that of the P/SP-CIS-RS. In particular, since the new RAT considers CSI-RS transmission on many antenna ports (e.g., 32 ports) using a relatively small amount of resources (e.g., 2 symbols), the number of orthogonal CSI-RS resources may not be sufficiently secured. In addition, the overlap between transmission timings may cause that a plurality of CSI-RSs are transmitted on the same resource. That is, if a BS transmits different RSs on the same resource, interference occurs between the RSs and the measurement performance of a UE may be degraded. Therefore, an operation is required to avoid such a problem.

The operation may be applied when each of a plurality of BSs transmits a CSI-RS as in coordinated multiple transmission reception points (CoMP), that is, when time-frequency resources for CSI-RS transmission are not coordinated.

Although the present disclosure is described based on the 3GPP LTE system for convenience of description, but the disclosure may be applied to other systems (e.g., UTRA, etc.) besides the 3GPP LTE system.

Alt 1. Dropping of Colliding CSI-RS

When a plurality of different CSI-RSs are intended to be transmitted on the same resource (e.g., the same time/frequency/code resource) at the same time, a BS drops a secondary CSI-RS and transmits only a primary CSI-RS according to a predetermined CSI-RS priority order. When two or more time/frequency resources for CSI-RS transmission overlap, a UE performs CSI-RS measurement by assuming that a CSI with the highest priority is transmitted and other CSI-RSs are not transmitted.

To determine the priority order, the degree of urgency of measured channel information may be considered. It is particularly applied to an A-CSI-RS. Specifically, since the A-CSI-RS is dynamically transmitted when a BS requires channel information for a specific operation (for example, for adaptation to a suddenly degraded channel state), the A-CSI-RS may have a higher priority than a P/SP-CSI-RS for monitoring a channel state periodically.

In addition, the priority order of CSI-RSs, and more particularly, the priority order of P/SP-CSI-RSs may be determined according to CSI-RS transmission periodicities. That is, the priority order is determined by considering the effect of CSI-RS dropping. Since dropping a CSI-RS with a short transmission periodicity has a smaller effect than dropping a CSI-RS with a long transmission periodicity, the CSI-RS with the long transmission periodicity may have a higher priority than the CSI-RS with the short transmission periodicity.

Moreover, the priority order may be determined according to time variation of CSI to be measured. For example, since the CSI reflects measured fast-fading characteristics of a channel, its purpose is to measure quickly varying channel characteristics compared to BM or RRM for measuring the intensity of a channel. Therefore, a CSI-RS for CSI may have a higher priority than a CSI-RS for BM or a CSI-RS for RRM.

Considering the above matters, the CSI-RS priority order may be defined as follows.

A. A-CSI-RS>P/SP-CSI-RS i. Considering that an A-CSI-RS is transmitted by a BS for additional channel measurement (i.e., CSI or BM) when performance degradation is expected, the A-CSI-RS may have a higher priority than a P/SP-CSI-RS to prevent the performance degradation from occurring when the A-CSI-RS is missed.

B. P/SP-CSI-RS for BM>P/SP-CSI-RS for CSI i. Considering that a CSI-RS for BM is transmitted with a relatively long periodicity, dropping thereof may cause significant performance degradation compared to when a P/SP-CSI-RS for CSI is dropped. Therefore, the CSI-RS for BM may have a higher priority than the CSI-RS for CSI.

C. A-(NZP-)CSI-RS>A-ZP-CSI-RS i. An A-ZP-CSI-RS may mean dynamic rate-matching signaling for A-CSI-RS transmission regions for UEs in the same cell or other reasons. To reduce signaling overhead, a BS may transmit, to a plurality of UEs, a union of A-CSI-RS regions to be transmitted to the UEs as the A-ZP-CSI-RS.

ii. Considering that an A-CSI-RS for a UE may be transmitted in a part of the A-ZP-CSI-RS region, an A-(NZP-)CSI-RS may have a higher priority than the A-ZP-CSI-RS.

D. A-ZP-CSI-RS>P/SP-CSI-RS i. To avoid a potential collision between an A-CSI-RS and a P/SP-CSI-RS, which are transmitted to different UEs, the priority of the A-ZP-CSI-RS may be set to be higher than that of the P/SP-CSI-RS as in Case A (A-CSI-RS>P/SP-CSI-RS).

E. A-CSI-RS for CSI>A-CSI-RS for BM i. In the case of an A-CSI-RS, channel measurement for CSI where channel variation is high may be prioritized over channel measurement for BM where channel variation is low.

ii. However, since a BS may easily manage a collision between the two A-CSI-RSs, for example, by preventing the transmission timings thereof from overlapping, the two A-CSI-RSs may have the same priority.

F. A-CSI-RS for CSI<A-CSI-RS for BM i. An A-CSI-RS for BM is a CSI-RS transmitted to a UE in the following cases: when the current link (e.g., an analog beam for PDCCH transmission and reception) is not correctly established (for example, when the used Tx/Rx beam is not available anymore for some reasons such as UE movement, blocking, etc.); and when it is necessary to reconfigure the currently transmitted eNB (BS) beam and/or UE beam. That is, since the A-CSI-RS for BM plays an important role in the overall operation for the corresponding UE such as control channel transmission and reception, etc., the A-CSI-RS for BM may have a higher priority than an A-CSI-RS for obtaining CSI to be used for data transmission and reception after link establishment.

G. CSI-RS for required channel measurement>CSI-RS for interference power measurement i. If a UE uses a measurement result (e.g., an average) during a long time period for interference power measurement, it is expected that performance is not significantly degraded even though an intermediate measurement is omitted.

ii. However, if the interference measurement is performed in a one-shot manner, a CSI-RS for interference power measurement and a CSI-RS for required channel measurement may have the same priority.

H. P-CSI-RS for RRM measurement>other P/SP-CSI-RSs i. Since a P-CSI-RS for RRM measurement is expected to have the longest transmission periodicity among CSI-RSs, the P-CSI-RS for RRM measurement may have the highest priority among P/SP-CSI-RSs to avoid performance degradation when it is dropped.

I. In the same type of CSI-RSs, it is assumed that priorities are given in order of CSI-RS configuration IDs or IDs corresponding thereto, and then dropping may be determined based on the priorities.

In summary, the CSI-RS priority order may be defined as follows.

A-CSI-RS (for CSI)>(A-CSI-RS for BM>) A-ZP-CSI-RS>P-CSI-RS for RRM measurement>P/SP-CSI-RS for BM>P/SP-CSI-RS for CSI For example, when transmission of an A-CSI-RS for CSI overlaps with transmission of a P-CSI-RS for BM, a BS may drop the P-CSI-RS for BM and transmit the A-CSI-RS for CSI (since the priority of the A-CSI-RS for CSI is higher than that of the P-CSI-RS for BM). When two or more CSI-RS transmission time/frequency resources overlap, a UE may measure the highest priority CSI-RS for the corresponding purpose by assuming that only the highest priority CSI-RS is transmitted and other CSI-RSs are not transmitted.

A periodic/semi-persistent rate-matching configuration for informing a region in which a P/SP-CSI-RS is transmitted may not be included in the above priority chain since a BS may easily set the region to be different from other CSI-RS regions.

For flexibility, CSI-RS priorities may be separately configured through higher layer signaling such as RRC/MAC signaling.

When an A-CSI-RS collides with a P/SP-CSI-RS, if the measurement restriction (MR) of the P/SP-CSI-RS is turned off, the priority order of A-CSI-RS>P/SP-CSI-RS may be problematic (that is, when the MR is turned on, interference measurement results are not averaged for a subframe(s) or a slot(s), but when the MR is turned off, the interference measurement results are averaged for the subframe(s) or the slot(s)). This is because when an A-CSI-RS is transmitted for UE 1 and the corresponding A-CSI-RS collides with a P-CSI-RS used by UE 2, the measurement result of the P-CSI-RS may become erroneous due to the A-CSI-RS from the perspective of UE 2. When the MR is turned on, this CSI measurement result may bypass if a BS ignores the reported CSI. Therefore, the priority order of A-CSI-RS>P/SP-CSI-RS may be applied only when the MR of P/SP-CSI-RS is turned on.

When the MR of the P/SP-CSI-RS is turned off, if a UE detects an error (for example, different sequences) while averaging measurement results and autonomously processes the corresponding measurement results or if the UE cancels or mitigates the error, for example, corrects the erroneous measurement result during the averaging process using a large time window, the priority order of A-CSI-RS>P/SP-CSI-RS may be established. If the effect of the error mitigation is sufficiently large, the priority of A-CSI-RS>P/SP-CSI-RS may be applied only when the MR of P/SP-CSI-RS is turned off.

To protect an A-CSI-RS for another UE, a BS may instruct a UE to empty a corresponding resource through dynamic signaling such as DCI. To this end, the BS informs the UE of the resource in which the A-CSI-RS for another UE is to be transmitted in advance and then transmits the dynamic signaling to the UE when the resource actually needs to be emptied. To this end, the BS may configure one or more CSI-RS puncturing resources for the UE, and the UE may ignore a value measured from a CSI-RS resource which overlap with the resource(s) indicated through the signaling. The UE may skip calculation/reporting of CSI which uses the corresponding measurement value, and the BS may expect that the corresponding CSI will not be reported.

Such a configuration may be included in a resource configuration for PDSCH rate-matching, and its priority may be configured with respect to RSs. That is, although a PDSCH RE may be generally set as a rate-matching resource (RMR) (specifically, a UE performs PDSCH (or PUSCH) rate-matching on a configured RMR), in the case of a CSI-RS, similar operation may be performed on a specific resource. In other words, the conventional PDSCH rate-matching corresponds to an operation of transmitting or receiving data on the assumption that no data symbol is transmitted on a corresponding RE, but the operation for the CSI-RS may indicate that the measurement result of an RS transmitted in a corresponding RMR RE is not available. Since the purpose of the above operation is to protect the A-CSI-RS for another UE, the above-described CSI-RS puncturing operation may be performed on the RMR. To this end, a CSI-RS puncturing indicator is configured on the RMR, and it may be signaled to the UE that not only a PDSCH but also an overlapping CSI-RS are dropped (or measurement thereof is not necessary) when the UE performs rate-matching on the corresponding resource according to the corresponding indicator. The RMR may overlap fully or partially with a P/SP-CSI-RS, and in this case, the UE may drop the entirety of the measurement value of the P/SP-CSI-RS. Alternatively, the UE may drop only a part overlapping with the RMR and calculate/report CSI using the reset of the measurement value.

In this case, RMR signaling is valid only in a slot where PDSCH scheduling exists. However, to block P/SP-CSI-RS measurement in a slot where no PDSCH scheduling exists, such signaling is still required. To this end, information indicating that DL grant DCI including the RMR signaling is not for PDSCH resource allocation may be transmitted in a specific field of the corresponding DCI. For example, if a resource allocation (RA) filed indicating a specific state, for instance, a state in which everything is 0 is transmitted to a UE, the UE may know that corresponding DCI is not related to PDSCH allocation and ignore a PDSCH transmission related field in the corresponding DCI, for example, the content of an RA/MCS/NDI (new data indicator). Alternatively, if an MCS field transmitted to a UE indicates a specific state, for example, if it indicates a retransmission-related state such as MCS states 29 to 31 even though there is no previous data transmission, the UE may ignore a PDSCH transmission related field in corresponding DCI, for example, an RA/MCS/NDI.

Further, a BS may transmit 'dynamic MR on' signaling to a UE in DCI. In this case, the UE may exclude a P/SP-CSI-RS measurement result at the time indicated by the corresponding signaling from averaging and, at the same time, apply the above-described priority order of A-CSI-RS>P/SP-CSI-RS.

The above signaling may be implicitly performed by DCI signaling. For example, when a resource for PDSCH rate-matching is signaled in DCI, if the corresponding resource overlaps with a P/SP-CSI-RS, a UE may ignore a corresponding measurement result even though there is no CSI-RS puncturing indicator. In other words, the resource for PDSCH rate-matching includes no CSI-RS RE. As another example, when an A-CSI-RS is indicated by common DCI, if a UE confirms transmission of the A-CSI-RS which collides with a P/SP-CSI-RS that the UE should measure, the UE may ignore the measurement result of the colliding P/SP-CSI-RS at the time when the A-CSI-RS is transmitted or exclude the measurement result from averaging.

Figure 5:
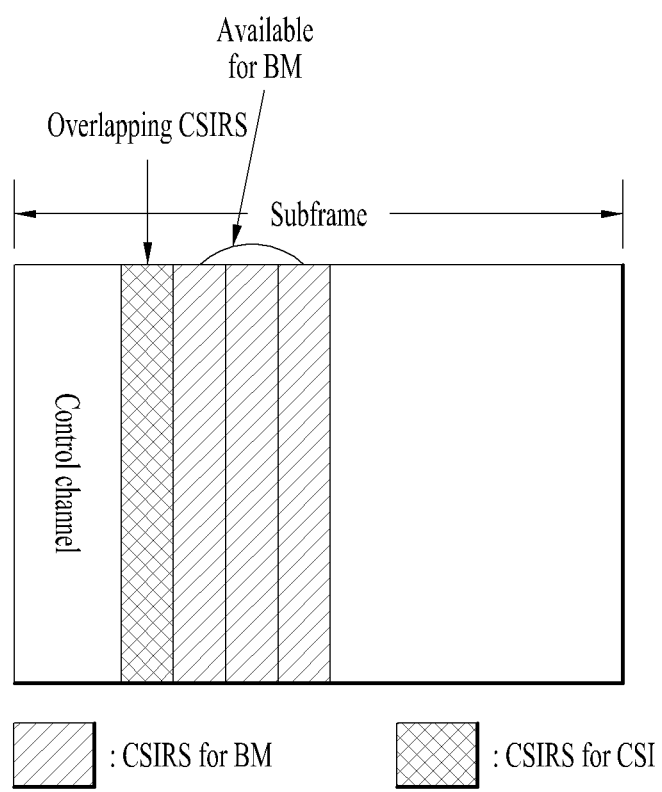
FIG. 5 illustrates a case in which different types of CSI-RSs overlap in a time region.

If some CSI-RS transmission resources overlap, a UE may drop the overlapping resources and use the remaining resources. For example, if a UE drops some symbols among a plurality of CSI-RS symbols for a CSI-RS for BM, which overlap with those for a CSI-RS for CSI, the UE may use the remaining symbols for the CSI-RS for BM. For example, as shown in FIG. 5, when a CSI-RS for BM using 4 symbols collides with a CSI-RS for CSI using 1 symbol, the CSI-RS symbols where there is no collision may be used for the CSI-RS for BM except the colliding symbol.

To this end, a BS may allocate a CSI-RS symbol for BM which corresponds to a (analog) beam with a relatively low priority (for example, a (analog) beam with the lowest RSRP) as a CSI-RS symbol where a collision is expected. Since the allocation is transparent to a UE, the UE manages beams corresponding to non-dropped CSI-RS symbols. Assuming that a CSI-RS for CSI is defined within a maximum of k symbols, one symbol after the (k+1)-th symbol, more particularly, the last symbol of a CSI-RS for BM may be defined as a CSI-RS symbol for BM for the currently used (analog) beam. When (analog) beams are measured for BM, individual measurement results need to be compared with the currently used (analog) beam. Thus, it may be defined that the CSI-RS for BM corresponding to the current (analog) beam is transmitted in a symbol which is relatively collision-free. In addition, if some resources among symbols for transmitting a CSI-RS for BM can be used for data transmission, continuity with remaining data transmission regions may be established so that no extra DMRS transmission is required for separate data regions.

Figure 6:
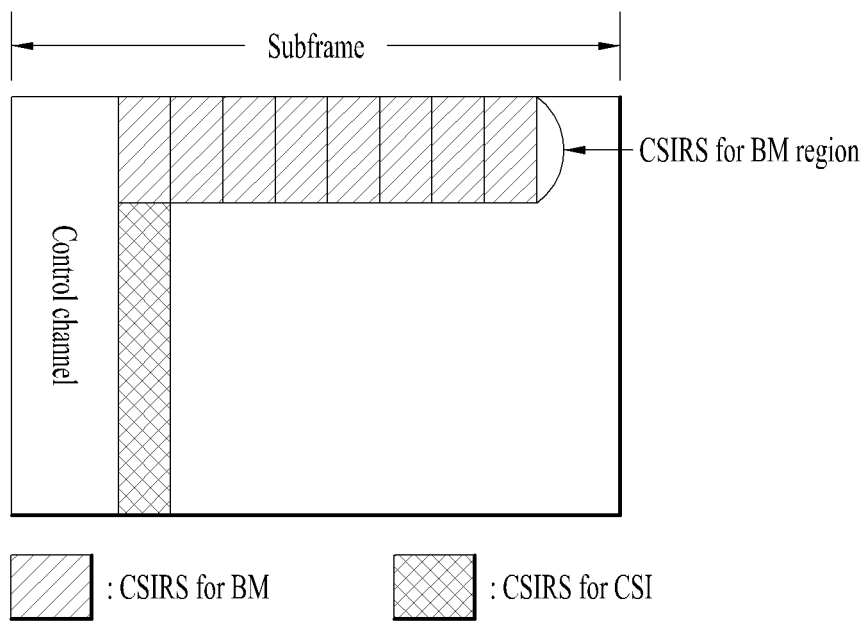
FIG. 6 illustrates a case in which different types of CSI-RSs overlap in a frequency region.

As another example, a CSI-RS for CSI may collide with a CSI-RS for BM in a certain frequency region. If the priority of the CSI-RS for BM is higher than that of the CSI-RS for CSI (i.e., CSI-RS for BM>CSI-RS for CSI), a part of the RS region for the CSI-RS for CSI which does not overlap with that for the CSI-RS for BM may be used for CSI calculation/reporting. FIG. 6 illustrates a resource structure where a CSI-RS for BM is mapped to a part of a frequency resource region and a CSI-RS for CSI is mapped to the remaining frequency resource region.

Considering a CSI-RS for CSI, if an A-CSI-RS for CSI is transmitted while a SP/P-CSI-RS for CSI is transmitted, it may be difficult for a UE to calculate and report CSI for the two CSI-RS in a given time. Thus, even though CSI-RS transmission timings exactly overlap with each other, if CSI-RSs are transmitted within a certain time period (e.g., 4 ms), it may be considered as a collision and thus, the above operation may be performed. For example, if a SP-CSI-RS and an A-CSI-RS are sequentially transmitted within 4 ms, a UE may update and report CSI only for the A-CSI-RS. For the SP-CSI-RS, the UE may report previous CSI with no update or skip feedback to save UL resources.

Alt 2. Transmission of Colliding CSI-RS Using Additional CSI-RS Resource Based on CSI-RS Hierarchy When a plurality of different CSI-RSs are intended to be transmitted on the same resource at the same time, only the highest priority CSI-RS is transmitted on the corresponding resource according to a predetermined CSI-RS priority order, and the remaining secondary CSI-RSs may be transmitted on predetermined N additional CSI-RS resources. When the N additional CSI-RS resources are defined, resource allocation priorities may be defined for the N additional resources. Thereafter, colliding CSI-RSs may be sequentially allocated to the resources according to the resource allocation priorities and then transmitted.

Figure 7:
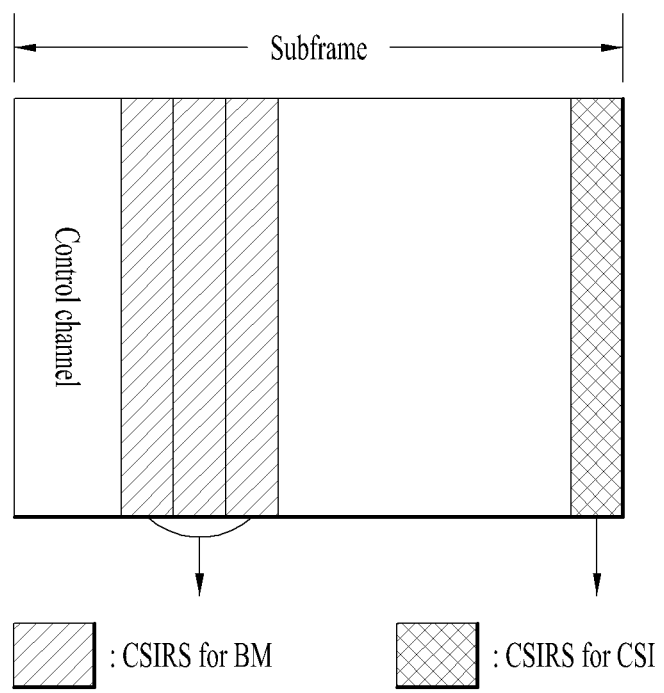
FIG. 7 illustrates that a CSI-RS is transmitted on an added resource.

For example, it is assumed that k symbols ahead from the last symbol of a subframe are defined as a CSI-RS resource and b symbols behind from a symbol next to a control channel of the subframe are defined as one additional CSI-RS resource. If a SP-CSI-RS for CSI collides with a P-CSI-RS for BM and the priority of the SP-CSI-RS for CSI is higher than that of the P-CSI-RS for BM (i.e., SP-CSI-RS for CSI>P-CSI-RS for BM), the SP-CSI-RS for CSI may be transmitted on the existing CSI-RS resource (i.e., the k symbols ahead from the last symbol of the subframe), and the P-CSI-RS for BM may be transmitted on the additional CSI-RS resource (i.e., the b symbol behind from the symbol next to the control channel of the subframe). FIG. 7 illustrates CSI-RS allocation on an additional CSI-RS resource.

In this case, N may be limited to 1 to reduce overhead caused when too many CSI-RS resources are defined.

The additional CSI-RS resource (region) may have a relatively small size, and priorities may be defined according to CSI-RS port numbers. For example, the priority order of (CSI-RS with antenna pot number greater than 8)>(CSI-RS with antenna port number less than or equal to 8) may be defined.

In addition, the additional CSI-RS resource (region) may be used by configuring an offset for an existing CSI-RS symbol. That is, if a CSI-RS collides with another CSI-RS with a higher priority in the fifth symbol of a slot, which corresponds to the location of the CSI-RS indicated by an existing CSI-RS configuration, the location of the corresponding CSI-RS may be changed to a symbol obtained by adding the original location to n symbols (for example, n=4). Alternatively, such an offset may be defined in each slot, a colliding CSI-RS with a lower priority may be (re)transmitted using k slot offsets.

The method proposed in the present disclosure may be applied on a resource set basis. For example, a CSI-RS for BM may be transmitted by binding multiple resources to a set, and a UE may select N best beams for the resources included in the corresponding set (different beams are used on the multiple resources, respectively, and thus each resource represents a different beam) and/or report CSI (for example, L1-RSRP) for each resource. In this case, if some resources in the set collide with each other, the method proposed in the present disclosure may be applied not only to the colliding resources but also to the whole resources included in the set.

The above-described principle may be applied when another RS rather than a CSI-RS (for example, a BMRS for BM) is defined and a collision occurs between different types of RSs. In particular, when a CSI-RS is designed for various usages such that it can be flexibly configured for multiple purposes (for example, CSI, BM, RRM measurement, etc.), the principle may be applied to such a unified RS in a similar way.

Further, the present disclosure is described based on the 3GPP LTE system for convenience of description, but the disclosure is applicable to other systems (e.g., UTRA, etc.) besides the 3GPP LTE system, and more particularly, to the 5G system and candidate technologies thereof.

Figure 8:
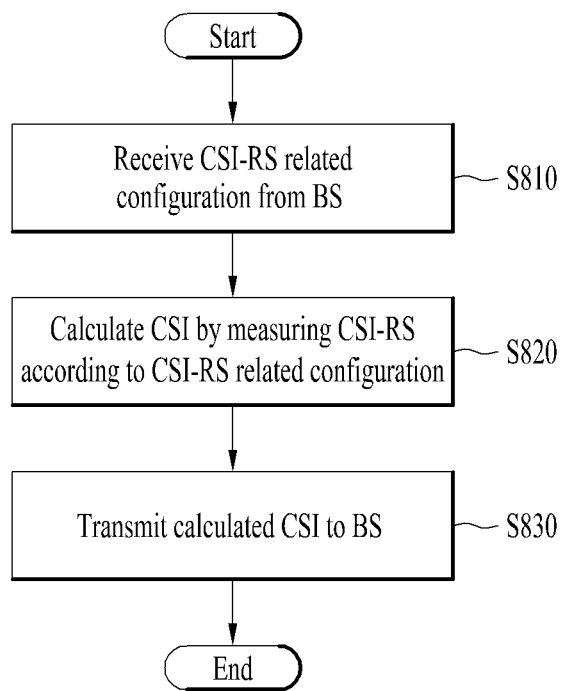
FIG. 8 illustrates UE operation according to an embodiment of the present disclosure.

FIG. 8 illustrates an operation according to an embodiment of the present disclosure.

Specifically, FIG. 8 shows a method of reporting a channel state based on a CSI-RS in a wireless communication system.

A UE may receive CSI-RS related configuration from a BS (S810). The UE may calculate CSI by measuring CSI-RS according to the CSI-RS related configuration (S820) and transmit the calculated CSI to the BS (S830). The CSI-RS related configuration may include configurations on different types of CSI-RSs, and if at least two different types of CSI-RSs are configured to be transmitted on the same resource, the UE may measure only a CSI-RS with a higher predetermined priority.

The different types of CSI-RSs may include a P-CSI-RS for CSI, an A-CSI-RS for CSI, a SP-CSI-RS for CSI, a P-CSI-RS for BM, an A-CSI-RS for BM, or a SP-CSI-RS for BM.

The predetermined priority may depend on the degree of urgency of CSI, the transmission periodicity of the CSI-RS, or the time variation of the CSI-RS.

The CSI-RS related configuration may include information on a resource to which no CSI-RS is allocated.

The information on the resource to which no CSI-RS is allocated may be to protect a CSI-RS for another UE.

When the resource to which no CSI-RS is allocated partially overlaps with a resource to which a CSI-RS is allocated, the UE may measure only a CSI-RS received on a non-overlapping resource.

When a resource to which a CSI-RS for BM is allocated partially overlaps with a resource to which a CSI-RS for CSI is allocated, the CSI-RS for BM may be transmitted for a beam currently used by the BS in the last symbol of the resource to which the CSI-RS for BM is allocated.

When an A-CSI-RS and a P/SP-CSI-RS are configured to be transmitted on the same resource, the UE may measure only the A-CSI-RS.

When a plurality of CSI-RSs are configured to be transmitted on the same resource, the UE may measure only a CSI-RS with the longest transmission periodicity.

In the foregoing description, the embodiments of the present disclosure have been briefly explained with reference to FIG. 8. The embodiment related to FIG. 7 may alternatively or additionally include at least part of the aforementioned embodiments.

Figure 9:
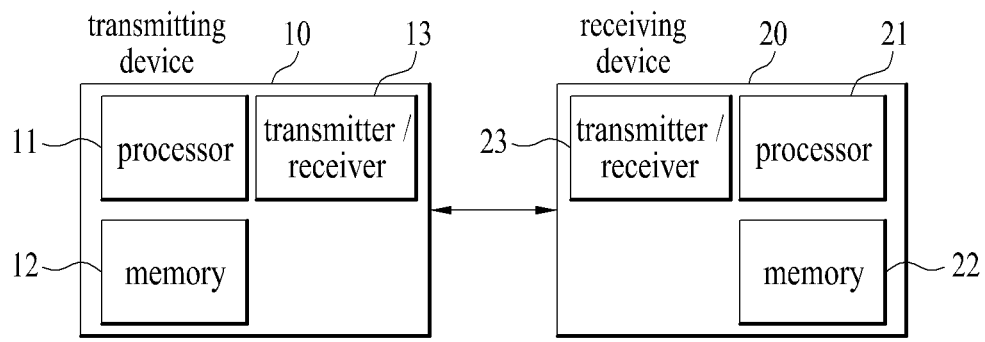
FIG. 9 is a block diagram for a device configured to implement embodiment(s) of the present disclosure.

FIG. 9 is a block diagram of a transmitting device 10 and a receiving device 20 configured to implement exemplary embodiments of the present disclosure. Referring to FIG. 9, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay, and an eNB.

The invention claimed is:

1. A method of reporting a channel state based on a channel state information-reference signal (CSI-RS) in a wireless communication system, the method comprising:

receiving, from a base station, a CSI-RS related configuration;

calculating CSI by measuring a CSI-RS according to the CSI-RS related configuration; and transmitting, to the base station, the calculated CSI, wherein the CSI-RS related configuration includes configurations for different types of CSI-RSs, wherein based on that resources configured to transmit two different types of CSI-RSs are overlapped, (i) a CSI-RS with a high priority is received in the resources and (ii) a CSI-RS with a low priority is received in an additional resource, wherein the additional resource is configured in symbols immediately following symbols in which a control channel is transmitted in a subframe, and wherein priorities of CSI-RSs are configured by a higher layer signal.

2. The method of claim 1, wherein the different types of CSI-RSs include a periodic CSI-RS for CSI, an aperiodic CSI-RS for CSI, a semi-persistent CSI-RS for CSI, a periodic CSI-RS for beam management (BM), an aperiodic CSI-RS for BM, or a semi-persistent CSI-RS for BM.

3. The method of claim 1, wherein a priority of a CSI-RS is determined according to a degree of urgency of CSI, a transmission periodicity of the CSI-RS, or time variation of the CSI-RS.

4. The method of claim 1, wherein the CSI-RS related configuration includes information regarding a resource to which the CSI-RS is not allocated.

5. The method of claim 4, wherein the information regarding the resource to which the CSI-RS is not allocated is to protect a CSI-RS for another UE.

6. The method of claim 4, further comprising, based on the resource to which the CSI-RS is not allocated partially overlapping with a resource to which a CSI-RS is allocated, measuring only a CSI-RS received on a non-overlapping resource.

7. The method of claim 2, wherein the CSI-RS with the high priority is the semi-persistent CSI-RS for CSI, and the CSI-RS with the low priority is the periodic CSI-RS for BM.

8. A user equipment (UE) configured to report for reporting a channel state based on a channel state information-reference signal (CSI-RS) in a wireless communication system, the UE comprising;

a transmitter;

a receiver; and a processor configured to control the transmitter and the receiver, wherein the processor is further configured to:

receive, from a base station, a CSI-RS related configuration;

calculate CSI by measuring a CSI-RS according to the CSI-RS related configuration; and transmit, to the base station, the calculated CSI, wherein the CSI-RS related configuration includes configurations for different types of CSI-RSs, wherein based on that resources configured to transmit two different types of CSI-RSs are overlapped, (i) a CSI-RS with a high priority is received in the resources and (ii) a CSI-RS with a low priority is received in an additional resource, wherein the additional resource is configured in symbols immediately following symbols in which a control channel is transmitted in a subframe, and wherein priorities of CSI-RSs are configured by a higher layer signal.

9. The UE of claim 8, wherein the different types of CSI-RSs include a periodic CSI-RS for CSI, an aperiodic CSI-RS for CSI, a semi-persistent CSI-RS for CSI, a periodic CSI-RS for beam management (BM), an aperiodic CSI-RS for BM, or a semi-persistent CSI-RS for BM.

10. The UE of claim 8, wherein a priority of a CSI-RS is determined according to a degree of urgency of CSI, a transmission periodicity of the CSI-RS, or time variation of the CSI-RS.

11. The UE of claim 8, wherein the CSI-RS related configuration includes information regarding a resource to which the CSI-RS is not allocated.

12. The UE of claim 11, wherein the information regarding the resource to which the CSI-RS is not allocated is to protect a CSI-RS for another UE.

13. The UE of claim 11, wherein the processor is further configured to:

based on the resource to which no CSI-RS is allocated partially overlapping with a resource to which a CSI-RS is allocated, measure only a CSI-RS received on a non-overlapping resource.

14. The UE of claim 9, wherein the CSI-RS with the high priority is the semi-persistent CSI-RS for CSI, and the CSI-RS with the low priority is the periodic CSI-RS for BM.

* * * * *